3,391,130
VINYL-TRIS-(CHLOROMETHYL)-ACETATE AND HOMOPOLYMER

Richard Bolstad, Bronx, N.Y., and Matthew Guagliardo, Bloomfield, N.J., assignors to Interchemical Corporation, New York, N.Y., a corporation of Ohio
No Drawing. Filed Oct. 1, 1965, Ser. No. 492,300
2 Claims. (Cl. 260—89.1)

This invention relates to vinyl-tris-(chloromethyl)-acetate.

The monomer can be prepared by an ester interchange reaction between vinyl acetate and tris-(chloromethyl) acetatic acid. The monomer can be homopolymerized for example by the use of benzoyl peroxide as initiator in solution, or the like.

Comparisons with polyvinyl acetate showed that polyvinyl-tris-(chloromethyl)-acetate is the better of the two because of superior hardness, toughness, lower water absorption, and lower combustibility. Light stability is similar in both. It showed better light and heat stability than polyvinylidene chloride and polyvinyl chloride. Compared with copolymers of polyvinyl chloride and polyvinyl acetate, the polymer of this invention display better light stability. One of these commercial copolymers (of 87% vinyl chloride and 13% vinyl acetate), it is interesting to note, is an isomer of the polymer of this invention. It is not easily ignited, and is tougher than polymethacrylates or polyacrylates. The polymers of this invention differ from the well-known chlorine-containing polymers of the prior art by having no hydrogen atoms situated alpha to the chlorine atoms. Thus the properties of toughness and low fire hazard are attainable without the usual sacrifice of heat and light stability associated with chlorine containing polymers.

EXAMPLE 1

A mixture of 63 g. (0.732 mole) vinyl acetate, 25 g. (0.122 mole) tris-chloromethyl acetic acid, and 0.50 g. mercuric acetate was stirred 30 minutes and then 0.047 ml. of 100% sulfuric acid was added. The solution turned brown. Reflux temperature (77–81° C.) was maintained for 18 hours. Sodium acetate trihydrate (0.80 g.) was added to neutralize the solution. The excess vinyl acetate was removed by slowly increasing the temperature to 125° C. 42.5 g. of vinyl acetate came off. The residue was distilled through a micro Vigreux column, the distillate consisting of 4.5 g. of a colorless, water white product coming over at 85–90° C. under 4 mm. of mercury. The product has a refractive index of 1.4849 at 25° C. and analysis showed C 35.6%, H 4.0, Cl 46.3 as compared with the theoretical proportions, C 36.3%, H 3.9, and Cl 46.1.

EXAMPLE 2

Vinyl-tris-(chloromethyl)-acetate prepared as described in Example 1 was homopolymerized in suspension by the following method. 1 g. of the monomer, .001 g. of tertiarybutyl perbenzoate, .0001 g. of polyvinyl alcohol, and 1 g. water were heated to reflux overnight. The resulting mixture was poured into methanol. The product was dissolved in toluene and precipitated by blending the solution with ten times its volume of methanol three successive times. The dried product showed on analysis C 37.1%, H 3.2, Cl 45.8 as compared with the theoretical proportions C 36.3%, H 3.9, Cl 46.1.

Solution homopolymerization was carried out by refluxing for 30 hours a solution of 2.85 g. monomer and 0.14 g. of tertiarybutyl perbenzoate in 2.85 g. of toluene. Additional portions of 0.14 g. of the initiator were added after the 6th and after the 24th hour. 65.5% yield of polymer was obtained.

The tris-(chloromethyl)-acetic acid used in Example 1 was prepared by the method described in the Journal of the American Chemical Society, vol. 67 pp. 942–944 (1945).

"Vinylite VYHH-1" is a copolymer of 87% by weight of vinyl chloride and 13% of vinyl acetate.

What is claimed is:
1. Vinyl-tris-(chloromethyl)-acetate.
2. Polyvinyl-tris-(chloromethyl)-acetate.

References Cited
UNITED STATES PATENTS 3,218,350   11/1965   Pare et al. _____ 260—487

JOSEPH L. SCHOFER, *Primary Examiner.*

S. M. LEVIN, *Assistant Examiner.*